(12) United States Patent
Baur et al.

(10) Patent No.: US 12,331,519 B2
(45) Date of Patent: Jun. 17, 2025

(54) STRUCTURE AND CONSTRUCTION METHOD

(71) Applicant: Citra Group AG, Winterthur (CH)

(72) Inventors: Joel Baur, Cape Town (ZA); Benno Büeler, Winterthur (CH); Andreas Graf, Pieterlen (CH)

(73) Assignee: Citra Group AG, Winterthur (CH)

( * ) Notice: Subject to any disclaimer, the term of this patent is extended or adjusted under 35 U.S.C. 154(b) by 0 days.

(21) Appl. No.: 18/951,815

(22) Filed: Nov. 19, 2024

(65) Prior Publication Data

US 2025/0075497 A1 Mar. 6, 2025

Related U.S. Application Data

(63) Continuation of application No. PCT/IB2023/060338, filed on Oct. 13, 2023.

(30) Foreign Application Priority Data

Jan. 30, 2023 (GB) ...................................... 2301325
Aug. 21, 2023 (ZA) ................................. 2023/08056

(51) Int. Cl.
*B32B 13/00* (2006.01)
*B32B 13/02* (2006.01)
*B32B 13/04* (2006.01)
*E04C 2/288* (2006.01)

(52) U.S. Cl.
CPC ............ *E04C 2/2885* (2013.01); *B32B 13/02* (2013.01); *B32B 13/04* (2013.01); *B32B 2250/03* (2013.01); *B32B 2250/40* (2013.01); *B32B 2307/304* (2013.01); *B32B 2607/00* (2013.01)

(58) Field of Classification Search
CPC ... E04C 2/00; E04C 2/043; E04C 2/06; E04C 2/10; E04C 2/205; E04C 2/22; E04C 2/24; E04C 2/284; E04C 2/2885; B32B 13/00; B32B 13/02; B32B 13/04; B32B 2250/00;
(Continued)

(56) References Cited

U.S. PATENT DOCUMENTS 2,150,399 A    3/1939   Benedict
6,308,491 B1 * 10/2001  Porter ................. E04F 13/0875
                                                    52/794.1
(Continued)

OTHER PUBLICATIONS

PCT/IB2023/060338 International Preliminary Report on Patentability dated Nov. 18, 2024.
(Continued)

*Primary Examiner* — Chi Q Nguyen
(74) *Attorney, Agent, or Firm* — Wilson Sonsini Goodrich & Rosati

(57) ABSTRACT

A core wall structure is assembled by attaching together elements of lightweight thermal insulation material (16) and elements of mineral board (20), positioned between them to serve as webs (20) at spaced intervals. Opposing edges (22) of the webs (20) are exposed on outer surfaces (26,28) of the core wall structure, with recesses (24) around them. Skins (18) of cement-based plaster are applied to the outer surfaces (26,28) to cover the core wall structure at least in part and to embed the exposed edges (22) of the webs (20) at least in part in the cement-based plaster.

10 Claims, 2 Drawing Sheets

(58) Field of Classification Search
CPC ............ B32B 2250/03; B32B 2250/40; B32B 2307/304; B32B 2607/00
See application file for complete search history.

(56) References Cited

U.S. PATENT DOCUMENTS

| | | | | |
|---|---|---|---|---|
| 6,854,230 | B2* | 2/2005 | Starke | E04C 2/521 |
| | | | | 52/483.1 |
| 6,898,908 | B2 | 5/2005 | Messenger et al. | |
| 7,739,844 | B2 | 6/2010 | Gharibeh et al. | |
| 10,267,037 | B2* | 4/2019 | Stewart | E04G 9/02 |
| 10,294,668 | B2* | 5/2019 | Kreizinger | B32B 21/08 |
| 10,370,849 | B2* | 8/2019 | Lambach | E04B 1/10 |
| 10,494,813 | B2* | 12/2019 | Costanza | E04B 1/14 |
| 10,801,197 | B2* | 10/2020 | Fox | E04C 2/296 |
| 11,692,350 | B2* | 7/2023 | Barry | B32B 19/00 |
| | | | | 52/588.1 |
| 11,905,707 | B2* | 2/2024 | Giles | C08J 9/148 |
| 12,202,242 | B2* | 1/2025 | Loelsberg | B32B 7/12 |
| 2004/0065034 | A1 | 4/2004 | Messenger et al. | |
| 2004/0206032 | A1 | 10/2004 | Messenger et al. | |
| 2005/0055982 | A1* | 3/2005 | Medina | E04B 1/80 |
| | | | | 52/506.01 |
| 2012/0011793 | A1 | 1/2012 | Clark et al. | |
| 2014/0000204 | A1 | 1/2014 | Wu | |
| 2014/0087158 | A1* | 3/2014 | Ciuperca | B32B 3/266 |
| | | | | 428/223 |
| 2019/0093355 | A1 | 3/2019 | Baader | |
| 2021/0301526 | A1* | 9/2021 | Leahy | B32B 13/04 |

OTHER PUBLICATIONS

PCT/IB2023/060338 International Preliminary Report on Patentability dated Oct. 10, 2024.
PCT/IB2023/060338 International Preliminary Report on Patentability dated Oct. 16, 2024.
PCT/IB2023/060338 International Search Report and Written Opinion dated Feb. 2, 2024.

* cited by examiner

STRUCTURE AND CONSTRUCTION METHOD

CROSS-REFERENCE TO RELATED APPLICATIONS

This application is a continuation of International Patent Application No. PCT/IB2023/060338, filed Oct. 13, 2023, which claims the benefit of GB Patent Application No. 2301325.3, filed Jan. 30, 2023, and ZA Application No. 2023/08056, filed Aug. 21, 2023, each of which content are incorporated herein in their entirety and by this reference thereto.

FIELD OF THE INVENTION

This invention relates to the construction of buildings, including buildings for human habitation and for other purposes, and including single or multiple storey buildings.

BACKGROUND

Conventional building technologies such as brick and mortar are often complemented with thermal insulation. Thermal insulation is applied in addition to other functional elements of the building, such as structural walls. This increases costs, time for construction, and requires additional space. Especially in buildings with space, cost, or weight constraints such as affordable housing or high-rise buildings, this approach of adding layers of different functions can cause problems and in some instances prevent buildings from being economically or technically feasible.

Attempts have been made to combine structural and thermal elements, e.g. by providing pre-manufactured building modules, but construction methods developed to date fall short in at least one of: material cost; labour cost; structural integrity; thermal performance; durability (e.g. being weather proof); practicality (e.g. mounting objects on walls with fasteners driven into walls or by drilling holes into walls); extendibility with conventional tools and skills; or design freedom (e.g. rooms beyond certain dimensions dictated by logistical constraints of pre-manufactured building modules).

Building elements that span horizontally are frequently constructed from steel reinforced concrete, with the steel reinforcement in a tension zone, lower in the building element. However, while steel is stronger than concrete under tension, it is also prone to corrosion and to protect reinforcing steel in horizontally spanning concrete structures against moisture and corrosion, the steel is typically spaced from the underside of the structure, so that the steel is covered with a minimum coverage of concrete on the underside of the structure. The concrete below the steel reinforcement is not strong under tension and add little to the strength of the structure, but adds significantly to its weight and cost. Also, the concrete below the steel reinforcement is prone to cracking under tension, which shortens the lifespan of these structures.

The present invention seeks to provide for the construction of buildings that addresses these shortfalls, at least in part.

SUMMARY

According to one aspect of the present invention there is provided a structure comprising: an core wall structure comprising elements of lightweight thermal insulation material and webs of mineral board, said core wall structure having two opposing outer surfaces and said webs being positioned between the elements of lightweight material at spaced intervals to extend across the core wall structure, with opposing edges of the webs being exposed on the opposing outer surfaces of the core wall structure; and skins of cement-based plaster extending on the opposing outer surfaces of the core wall structure to cover the opposing sides of core wall structure at least in part; wherein the exposed edges of the webs are embedded at least in part in the skins of cement-based plaster on the opposing sides of the core wall structure.

The word "wall" is used herein to refer to a generally thin structure with generally parallel opposing surfaces, which could be upright (such as the inner and outer walls of a building), but it could also be horizontal (such as roofs and floors) or have any other orientations and it could be curved or straight in one or more dimensions.

The skins of cement-based plaster may be reinforced around the exposed edges of the webs, where those exposed edges are embedded in the skins of cement-based plaster. Preferably, edges of the elements of lightweight thermal insulation material are recessed (e.g. chamfered or rounded) adjacent the exposed edges of the webs, to provide space for the reinforcement of the skins of cement-based plaster.

According to another aspect of the present invention, there is provided a method of construction, said method comprising: assembling a core wall structure by positioning elements of lightweight thermal insulation material and webs of mineral board, said core wall structure having two opposing outer surfaces and said webs of mineral board being positioned between the elements of lightweight material to serve as connectors at spaced intervals, said webs extending across the core wall structure, with opposing edges of the webs being exposed on the opposing outer surfaces of the core wall structure; providing recesses around the exposed edges of the webs at the opposing outer surfaces of the core wall structure; applying skins of cement-based plaster to the opposing outer surfaces of the core wall structure to cover the core wall structure at least in part and to embed the exposed edges of the webs at least in part in the cement-based plaster.

The step of providing recesses around the exposed edges of the webs may comprise recessing edges of the elements of lightweight thermal insulation material adjacent the exposed edges of the webs, e.g. by chamfering or rounding the edges of the lightweight thermal insulation material.

The lightweight thermal insulation material may be expanded polystyrene, the mineral board may be magnesium oxide board, and the skins of cement-based plaster may include embedded reinforcement such as wire mesh or fibres.

The reinforcement embedded in the skins of cement-based plaster may include elongate tensile elements such as steel rods or basalt fibre reinforcement, embedded within one or both of the skins of cement-based plaster and the tensile elements may be aligned with the webs, e.g. the tensile elements may extend within one of the skins of cement-based plaster in close proximity to one of the embedded edges of one of the webs. The skin of cement-based plaster may be reinforced around the tensile element.

The method may include attaching a plurality of the core wall structures together before applying the skins of cement-based plaster to the opposing outer surfaces of the core wall structures and may include attaching the webs of adjacent core wall structures to each other.

BRIEF DESCRIPTION OF THE DRAWINGS

For a better understanding of the present invention, and to show how it may be carried into effect, the invention will now be described by way of non-limiting example, with reference to the accompanying drawings in which.

DETAILED DESCRIPTION OF THE DRAWINGS

Figure 1:
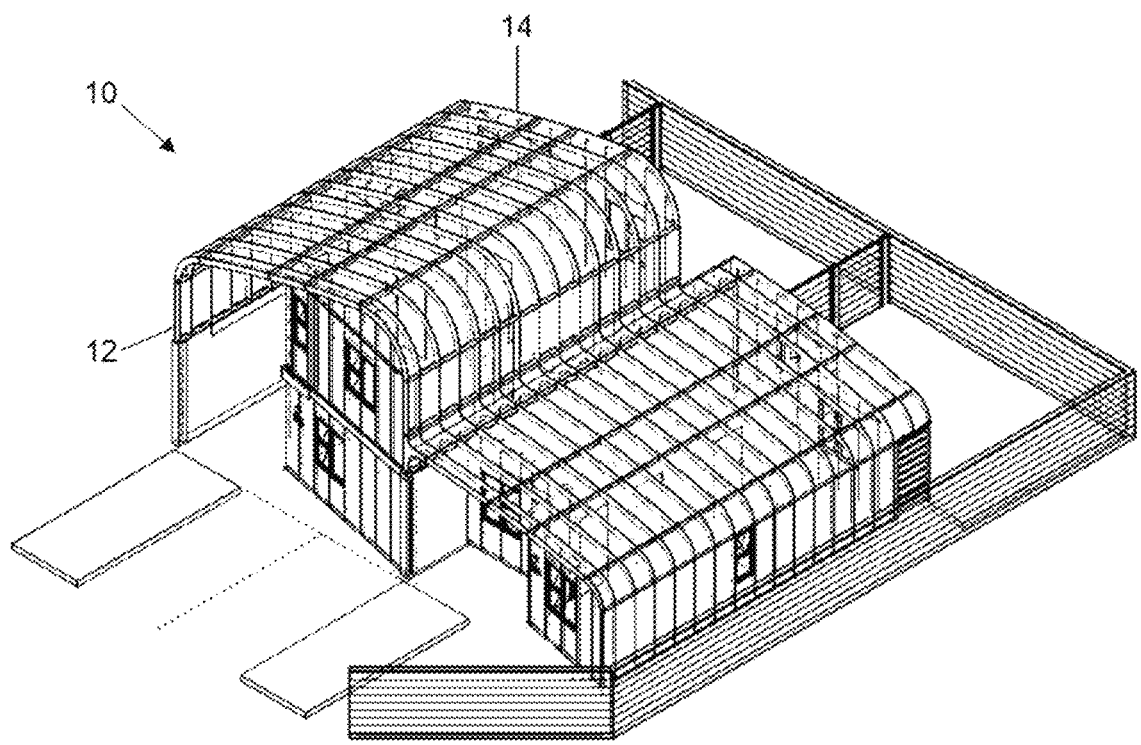
FIG. 1 shows a partly transparent three-dimensional view of a first embodiment of a structure in the form of a dwelling according to the present invention.
Figure 2:
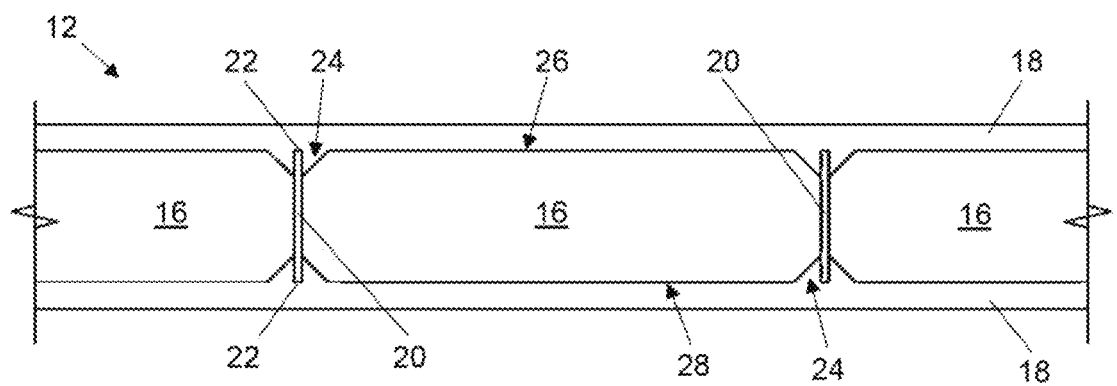
FIG. 2 shows a cross-sectional view of part of a second embodiment of a structure according to the present invention.

Referring to FIGS. 1 and 2, a first embodiment of a structure according to the present invention, in the form of a dwelling, is identified generally by reference sign 10 and a second embodiment of a structure according to the invention, in the form of a wall, is generally identified by reference sign 12. The wall 12 can have any orientation or shape and can serve the purpose of an external or internal wall of structural or non-structural nature and can be part of a roof. The dwelling 10 is constructed from multiple walls such as the wall 12, some of which are angled and curved to form a roof 14 of the dwelling.

Referring to FIG. 2, in the present invention, thermal insulation material 16 is provided at the core of the wall 12 and the main structural elements of the wall are two structural skins 18 on the opposing sides of the wall—which could be exterior and interior sides of the wall, for example. The two skins 18 are structurally connected at regular intervals by webs 20 with exposed edges 22 that are embedded in the skins. The term "exposed" is used in this context to refer to the fact that the opposing edges of the webs 20 are exposed from the thermal insulation material 16 and it does not necessarily mean that the edges protrude beyond the outer surfaces of the thermal insulation material. In fact in some instances the edges of the webs 20 are exposed from the adjacent thermal insulation material 16 within recesses formed along edges of the thermal insulation, but the edges of the webs are set back from the outer surfaces of the thermal insulation material. (This is shown particularly clearly in FIG. 3.)

The thermal insulation material 16 can be any suitable lightweight, thermally insulating material and one example that is highly suitable and cost-effective, is expanded polystyrene (EPS).

The structural skins 18 are made of a cement-based high strength plaster that is preferably reinforced with a mesh or fibres and the plaster can be applied in multiple layers.

The webs 20 are made of mineral boards with suitable mechanical properties that are preferably similar to the mechanical properties of the skins 18 and one example of mineral board that is highly suitable and cost-effective, is Magnesium Oxide board (MgO).

The connections between the exposed edges 22 of the webs 20 and the structural skins 18 are preferably strengthened with local thickening of the structural skins around the exposed edges. This is preferably achieved through a diagonal chamfer 24 along the edges of the EPS 16 adjacent the webs 20. A diagonal chamfer 24 is easy and cost-effective to form or cut (in the process described below), but in other embodiments, the shape of thickening of the structural skins 18 around the exposed edges 22 could take different forms—e.g. it could be rounded or could take the form of rectangular recesses.

The wall 12 primarily obtains its structural strength from the skins 18 and the webs 20 that effect load transfer (including compressive, tension, bending, and/or shear loads) between the structural skins. In addition to transferring loads between the skins 18, the webs 20 also increase the bending strength of the wall 12 by increasing the space between the skins, similar to the web of an I-beam increasing the second moment of area of the beam.

When the dwelling 10 or any other structure is constructed according to the present invention, core wall structures or panels are first assembled from elements in the form of blocks of the EPS 16 and elements in the form of strips of the MgO boards to form the webs 20.

The EPS 16 is typically cut from a block with a hot-wire CNC cutter and the webs 20 are typically cut from MgO board with a router CNC cutter. The EPS elements 16 and MgO webs 20 are then assembled into core wall structures in the form of wall and roof panels of different sizes. The EPS elements 16 and webs 20 are preferably attached together using a suitable adhesive such as polyurethane foam, although other attachment methods could be used instead. To serve their structural function best, each of the webs 20 extends continuously across the core panel. The cutting and assembly of the core panels can take place off site, e.g. in a factory or warehouse that need not be close to the construction site—or it can be done on site, if preferred.

Once assembled, each panel of the core wall structure has two opposing outer surfaces and for the purposes of illustration, these surfaces are identified as a top surface 26 and bottom surface 28 as shown in FIG. 2.

The webs 20 are spaced apart at intervals along the panel between the blocks of EPS 16 and each web extends across the panel so that the opposing edges 22 of each web are exposed from the EPS 16 on the opposing outer surfaces 26,28. The spacing and orientation of the webs 20 may be varied in different panels and is dictated by the structural requirements and manufacturing constraints, to provide appropriate load transfer for the structural strength required of the particular wall 12.

Recesses are provided around the exposed edges 22 of the webs 20 and in the illustrated embodiment, this is done by recessing edges of the blocks of EPS 16 adjacent the exposed edges with the diagonal chamfers 24, but in other embodiments, the edges of the blocks of EPS could be rounded or could be rectangular recesses and/or the exposed edges 22 could protrude beyond the outer surfaces 26,28.

Once the core wall panels have been assembled, they are transported to site and erected to form a thermal core of the wall 12 with the webs 20 preferably oriented to follow the direction of load transfer. The webs 20 of adjacent panels are preferably aligned and can be connected together to effect load-transfer between them, e.g. the webs of adjacent core panels can be connected by tongue-and-groove connections, but could also be attached by steel straps, or the like. In some embodiments of the invention, the webs 20 of adjacent core panels may be attached together, e.g. with clamps or rods. The erected structure is preferably temporarily supported (e.g. with braces, straps, and props) at this stage in order to hold the panels in their precise positions during application of the structural skins 18. Panels can be connected with adhesive such as polyurethane foam, fasteners, interlocking connections (such as tongue and groove connections), or the like to provide additional stability in high stress areas such as panels of the roof 14.

Once core wall panels are secured in position, the structural skins 18 are applied to the outer surfaces 26,28 of the panels in layers, generally working from the top of the structure downwards and from the outside of the structure inwards. The structural skins 18 can be applied by hand or spray application where the thermal core forms both the substrate and lost shutter.

The webs 20 provide structural strength to the core panels while the core panels are being erected and assembled, so that the support and bracing that is required is primarily to ensure precise positioning of the core panels. Furthermore, the webs 20 provide sufficient structural strength to the core panels so that the core panels can bear the weight of the structural skins 18 while they are being applied—even for non-vertical walls such as the roof, thus avoiding the need for extensive temporary load support such as scaffolds, props, etc.

As the structural skins 18 are applied, they cover the outer surfaces 26,28, but also cover and embed the exposed edges 22 of the webs. The connection between the exposed edges 22 and the skins 18 are reinforced by local thickening of the skins adjacent the exposed edges and the chamfers 24 provide space for the cement-based plaster of the skins to fill and form the reinforcement of the skins around the exposed edges.

Figure 3:
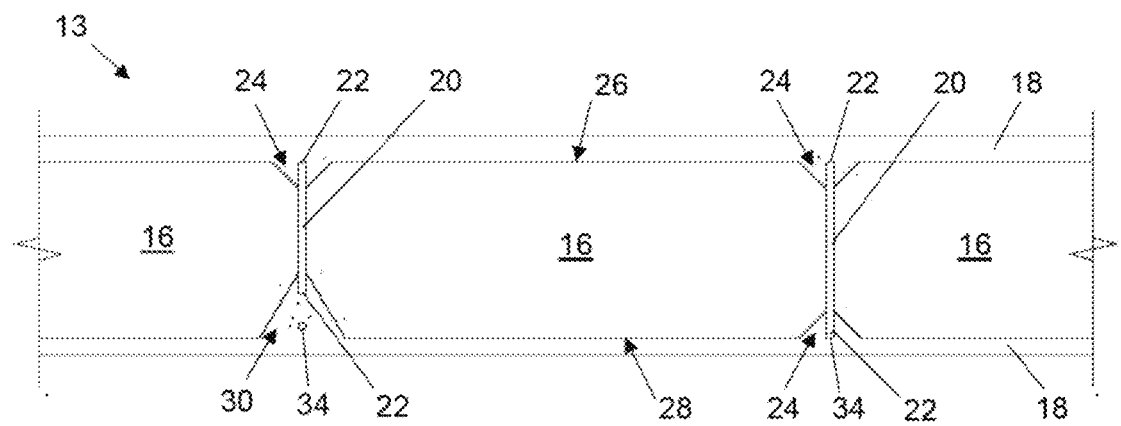
FIG. 3 shows a cross-sectional view of part of a third embodiment of a structure according to the present invention.

Referring to FIG. 3, a third embodiment of a structure according to the invention, in the form of a wall, is generally identified by reference sign 13. The wall 13 has many similarities in common with the wall 12 shown in FIG. 2, including EPS thermal insulation elements 16, structural skins 18 of cement-based high strength plaster, webs 20 of mineral boards such as Magnesium Oxide board (MgO), and exposed edges 22 of the webs are embedded in the structural skins.

The manner in which the webs 20 are embedded in the structural skin 18 applied to the top surface 26 in the wall 13 of FIG. 3 is identical to that in the wall 12 of FIG. 2, but the manner in which the webs are embedded in the structural skin applied to the bottom surface 28 is different from that shown in FIG. 2.

FIG. 3 shows two embodiments of recesses that are formed along bottom corners of the EPS elements 16. These embodiments of recesses would not necessarily be used in combination in practice (although they might), but they are shown in a single drawing for conciseness.

The recess 30 shown on the left in FIG. 3 is triangular and is cut deeper into the EPS elements 16 than shown in FIG. 3, whereas the recess 24 shown on the right in FIG. 3 is identical to the recess at the top of the web 20. In both recesses 30,24 the exposed edge 22 of the web 20 protrudes beyond the EPS elements 16 on either side of it, but the exposed edge of the web 20 on the left in FIG. 3 is recessed from the core panel as a whole. The result is that the recess 30 is much larger than the recesses 24 shown in FIG. 2 and tensile elements such as reinforcing rods 34 are embedded in the bottom structural skin 18. The reinforcing rods 34 can be made of steel, basalt fibres, high molecular weight polyethylene, carbon, or other alkaline resisting material with high tensile strength.

The reinforcing rods 34 are positioned before the structural skin 18 is applied and are each aligned with one of the webs 20. In the example of the web 20 and reinforcing rod 34 shown on the left in FIG. 3, the reinforcing rod is in close proximity to the exposed edge 22 of the web. However, in the example of the web 20 and reinforcing rod 34 shown on the right in FIG. 3, the reinforcing rod is in contact with the exposed edge 22 of the web.

Once the structural skin 18 is applied, both the reinforcing rods 34 and the exposed edges 22 of the webs 20 are embedded in the thickened portion of the skin 18 formed in the recesses 30,24, so that both the reinforcing rods and the webs can contribute to the strength of the structure 13 by transferring loads to/from the skins 18. The structural function of the webs 20 has been described above and this is synergistically supplemented with the ability of the reinforcing rods 34 to bear tensile loads, so that the structure 13 has remarkable bending strength and light weight, so that it can be used for large structures such as floors or roofs, with far less supports such as columns, than are required in current building methods.

Figure 4:
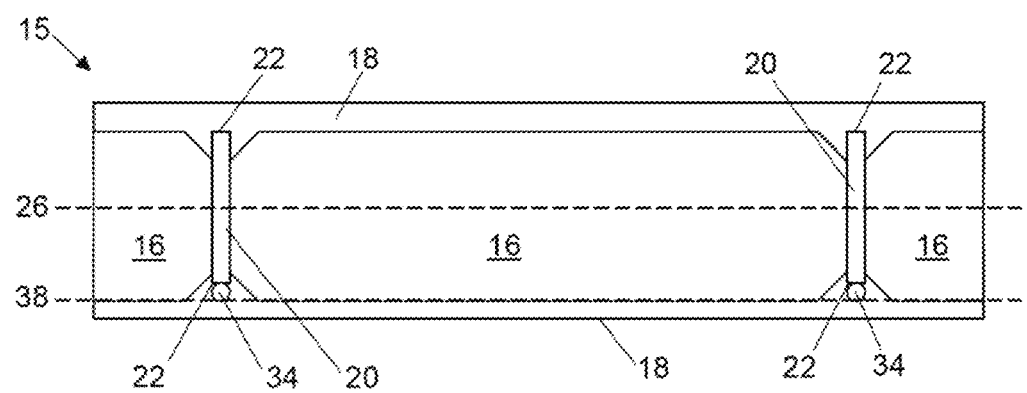
FIG. 4 shows a cross-sectional view of part of a fourth embodiment of a structure according to the present invention.

Referring to FIG. 4, a fourth embodiment of a structure according to the invention, in the form of a wall, is generally identified by reference sign 15. The wall 15 has many similarities in common with the wall 13 shown in FIG. 3, including EPS thermal insulation elements 16, structural skins 18 of cement-based high strength plaster, webs 20 of mineral boards, and exposed edges 22 of the webs and reinforcing rods 34 that are embedded in the structural skins.

The manner in which the webs 20 and reinforcing rods 34 are embedded in the structural skins 18 in the wall 15 of FIG. 4 are very similar to those in the wall 13 of FIG. 3, but the reinforcing rods 34 are made of basalt rebar, but could instead be made of fibreglass rebar or other non-corrosive high-tensile material.

When the wall 15 is used with a horizontal orientation as shown in FIG. 4, the basalt rebar rods 34 are below the lower edges 22 of the webs 20 and are in the tension zone, below a neutral axis 36 of the wall. The rebar rods 34 are covered on their underside with cementitious material of the structural skin 18 on the underside of the wall 15, but since the rebar rods are made of basalt, they do not need to be embedded as deeply in the cementitious material as steel rebar would have required to protect it from moisture. In the illustrated, preferred embodiment, bottom edges of the rebar rods 34 are aligned with the bottom surfaces of the thermal insulation elements 16 on a common axis 38.

The wall 15 can be used in any orientation, but it is particularly advantageous when used in horizontal or part-horizontal orientations, e.g. for roofs, internal floor slabs, foundations, or in connections between building elements where high tensile strength is required.

The wall 15 is constructed generally as described above, with reference to FIGS. 1 and 2. The basalt rebar reinforcing rods 34 are placed in the tension zone at the edges 22 of the webs 20 either in the factory or after erection of the panels on site. If the wall 15 is used horizontally, the rebar rods 34 need to be temporarily supported while applying the cementitious plaster to form the bottom skin 18. The plaster is preferably applied in two coats: A first base coat of about 2 to 5 mm thickness of the cementitious plaster is applied on the side of the panel with the greatest tensile design strength—which is the underside as shown in the FIG. 4. A second base coat of about 2 to 5 mm thickness is applied on the opposite side of the panel (the top, as illustrated in FIG. 4). A first main coat of the cementitious material is applied on the side of the panel with the lower tensile design strength (the top, as illustrated in FIG. 4). Thereafter, the cementitious material is allowed to cure sufficiently before removing the temporary supports and applying a second main coat on the side with the greater tensile design strength (the bottom, as illustrated in FIG. 4).

The wall 15 can also be constructed using steel rebar, but then more cementitious material of the skin 18 will be required to cover the rebar and this would lead to greater weight and reduced span width.

The invention claimed is:

1. A structure comprising:
    a core wall structure comprising elements of lightweight thermal insulation material and rigid mineral boards, said core wall structure having two opposing outer surfaces and at least some of said rigid mineral boards being positioned between the elements of lightweight material at spaced intervals to extend transversely across the core wall structure, with opposing edges of the mineral boards being exposed on the opposing outer surfaces of the core wall structure; and
    skins of cement-based plaster extending on the opposing outer surfaces of the core wall structure to cover opposing sides of core wall structure at least in part;
    wherein the exposed edges of the mineral boards are embedded at least in part in the skins of cement-based plaster on the opposing sides of the core wall struture, each of the mineral boards forming a rigid structural connection between the opposing skins of cement-based plaster wherein edges of the elements of lightweight thermal insulation material are recessed adjacent the exposed edges of the mineral boards, to provide space for the reinforcement of the skins of cement-based plaster.

2. The structure according to claim 1, wherein the skins of cement-based plaster are reinforced around the exposed edges of the mineral boards, where said exposed edges are embedded in the skins of cement-based plaster.

3. The structure according to claim 1, further comprising reinforcement embedded in the skins of cement-based plaster.

4. The structure according to claim 3, further comprising fibre reinforcement embedded in the skins of cement-based plaster.

5. The structure according to claim 3, further comprising elongate tensile elements embedded within at least one of the skins of cement-based plaster, said tensile elements being aligned with the mineral boards.

6. The structure according to claim 5, wherein at least some of said tensile elements extend within one of the skins of cement-based plaster in close proximity to one of the embedded edges of one of the mineral boards.

7. The structure according to claim 5, wherein the skin of cement-based plaster is reinforced around the tensile elements.

8. The structure according to claim 5, wherein the tensile elements are made of basalt.

9. The structure according to claim 1, wherein the lightweight thermal insulation material is expanded polystyrene.

10. The structure according to claim 1, wherein the mineral boards comprise magnesium oxide board.

* * * * *